(12) United States Patent
Watfa et al.

(10) Patent No.: US 11,570,634 B2
(45) Date of Patent: Jan. 31, 2023

(54) METHOD AND APPARATUS FOR INFORMING CHANGES IN COVERAGE ENHANCEMENT USAGE IN A NETWORK

(71) Applicant: Samsung Electronics Co., Ltd., Suwon-si (KR)

(72) Inventors: Mahmoud Watfa, Staines (GB); Ricky Kumar Kaura, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/248,552

(22) Filed: Jan. 28, 2021

(65) Prior Publication Data

US 2021/0243619 A1     Aug. 5, 2021

(30) Foreign Application Priority Data

Jan. 30, 2020   (GB) .................................... 2001317
Feb. 24, 2020   (GB) .................................... 2002595

(51) Int. Cl.
*H04W 24/02*     (2009.01)
*H04W 48/02*     (2009.01)
(Continued)

(52) U.S. Cl.
CPC .......... *H04W 24/02* (2013.01); *H04W 48/02* (2013.01); *H04W 60/00* (2013.01); *H04W 68/02* (2013.01)

(58) Field of Classification Search
CPC ..... H04W 24/02; H04W 48/02; H04W 60/00; H04W 68/02
(Continued)

(56) References Cited

U.S. PATENT DOCUMENTS

2017/0099682 A1   4/2017 Priyanto et al.
2018/0317194 A1*  11/2018 Chen ..................... H04W 76/27
(Continued)

FOREIGN PATENT DOCUMENTS

EP      3780884 A1    2/2021
WO   2017058283 A1    4/2017
(Continued)

OTHER PUBLICATIONS

3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019, 417 pages.
(Continued)

*Primary Examiner* — Joel Ajayi

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. There is disclosed a method, for a first network entity, for informing a change in coverage enhancement usage in a network comprising the first network entity and a user equipment (UE). The method comprises, in response to determining that a restriction on the use of coverage enhancement has changed for the UE, transmitting, to the UE, a first message including an indication of the change.

14 Claims, 6 Drawing Sheets

(51) Int. Cl.
*H04W 60/00* (2009.01)
*H04W 68/02* (2009.01)

(58) Field of Classification Search
USPC ...................................................... 455/435.1
See application file for complete search history.

(56) References Cited

U.S. PATENT DOCUMENTS

| | | | |
|---|---|---|---|
| 2019/0182897 | A1 | 6/2019 | Jain et al. |
| 2019/0349892 | A1 | 11/2019 | Alvarino et al. |
| 2021/0136840 | A1 | 5/2021 | Kawasaki et al. |

FOREIGN PATENT DOCUMENTS

| | | |
|---|---|---|
| WO | 2018145936 A1 | 8/2018 |
| WO | 2019198719 A1 | 10/2019 |

OTHER PUBLICATIONS

3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), Dec. 2019, 558 pages.
3GPP TS 24.501, V16.3.0 (Dec. 2019) Technical Specification, 3rd Generation Partnership Project; Technical Specification Group Core Network and Terminals; Non-Access-Stratum (NAS) protocol for 5G System (5GS); Stage 3; (Release 16), Dec. 2019, 645 pages.
International Search Report and Written Opinion of the International Searching Authority in connection with International Application No. PCT/KR2021/001078 dated Apr. 21, 2021, 7 pages.
Intel, et al., "Correction to Enhanced Coverage Restriction Control via NEF", 3GPP TSG-SA2 Meeting #136AH, S2-2000271, Incheon, South Korea, Jan. 13-17, 2020, 4 pages.
Ericsson, et al., "5GS NAS extended timers for NB-N1 mode and WB-N1/CE mode devices", 3GPP TSG-CT WG1 Meeting #121, C1-198979, Reno (NV), USA, Nov. 11-15, 2019, 15 pages.
European Search Report dated Jun. 17, 2021, in connection with European Application No. 21154357.4, 21 pages.
Intel, "Interim conclusion for Key issue #6," S2-186704, SA WG2 Meeting #128, Vilnius, Lithuania, Jul. 2-6, 2018, 5 pages.
Samsung, et al., "Change of the restriction of enhanced coverage," S2-2002092r09, SA WG2 Meeting #S2-137E e-meeting, Elbonia, Feb. 24-27, 2020, 4 pages.
Combined Search and Examination Report dated Jun. 22, 2021, in connection with United Kingdom Application No. GB2002595.3, 8 pages.
Combined Search and Examination Report dated Jun. 29, 2020, in connection with United Kingdom Application No. GB2001317.3, 6 pages.
CT1, "Reply LS on Restricted Use of Enhanced Coverage," R6-170469, 3GPP TSG RAN WG6 meeting #6, Reno, Nevada, USA, Nov. 27-Dec. 1, 2017, 2 pages.

* cited by examiner

METHOD AND APPARATUS FOR INFORMING CHANGES IN COVERAGE ENHANCEMENT USAGE IN A NETWORK

CROSS-REFERENCE TO RELATED APPLICATIONS

This application claims priority under 35 U.S.C. § 119(a) to GB Patent Application Serial No. 2001317.3, which was filed in the GB Patent Office on Jan. 30, 2020 and GB Patent Application Serial No. 2002595.3, which was filed on Feb. 24, 2020, the entire disclosure of each of these applications is incorporated herein by reference.

BACKGROUND

1. Field

Certain examples of the present disclosure provide methods, apparatus and systems for informing changes in coverage enhancement usage in a network. For example, certain examples of the present disclosure provide methods, apparatus and systems for informing a User Equipment (UE) about changes in coverage enhancement usage in 3rd Generation Partnership Project (3GPP) 5th Generation (5G) System (5GS).

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

It is an aspect of certain examples of the present disclosure to address, solve and/or mitigate, at least partly, at least one of the problems and/or disadvantages associated with the related art, for example at least one of the problems and/or disadvantages described above. It is an aim of certain examples of the present disclosure to provide at least one advantage over the related art, for example at least one of the advantages described below.

An aspect of the present disclosure provides a method and an apparatus for efficiently informing a change in coverage enhancement usage in a network.

In accordance with an aspect of the present disclosure, a method, for a first network entity, for informing a change in coverage enhancement usage in a network comprising the first network entity and a user equipment (UE) is provided, the method comprises identifying that a restriction on the use of coverage enhancement has changed for the UE; and in response to identifying that the restriction on the use of coverage enhancement has changed for the UE, transmitting, to the UE, a first message including an indication of the change.

In accordance with another aspect of the present disclosure, A method, for a UE, for informing a change in coverage enhancement usage in a network comprising a first network entity and the UE is provided, the method comprises receiving, from the first network entity, a first message including an indication of a change in a restriction on the use of coverage enhancement for the UE, and in response to the first message, initiating a registration procedure based on the indication.

In accordance with further aspect of the present disclosure, a method, for a UE, for informing a change in coverage enhancement usage in a network comprising a first network entity and the UE is provided, the method comprises receiving, from the first network entity, a first message including an indication of a change in a restriction on the use of coverage enhancement for the UE, and in response to the first message, changing a current use of coverage enhancement usage based on the type of use of coverage enhancement applied at the time the first message is received.

In accordance with further aspect of the present disclosure, a first network entity in a network comprising the first network entity and a UE is provided, the first network entity comprises a transmitter, and a processor configured to identify that a restriction on the use of coverage enhancement has changed for the UE, and in response to identifying that the restriction on the use of coverage enhancement has changed for the UE, transmit, to the UE, a first message including an indication of the change, through the transmitter.

In accordance with further aspect of the present disclosure, A UE in a network comprising a first network entity and the UE is provided, the UE comprises a receiver, and a processor configured to receive, through the receiver from the first network entity, a first message including an indication of a change in a restriction on the use of coverage enhancement for the UE, and in response to the first message, initiate a registration procedure based on the indication.

The present disclosure is defined in the independent claims. Advantageous features are defined in the dependent claims.

Other aspects, advantages, and salient features will become apparent to those skilled in the art from the following detailed description, taken in conjunction with the annexed drawings, which disclose examples of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
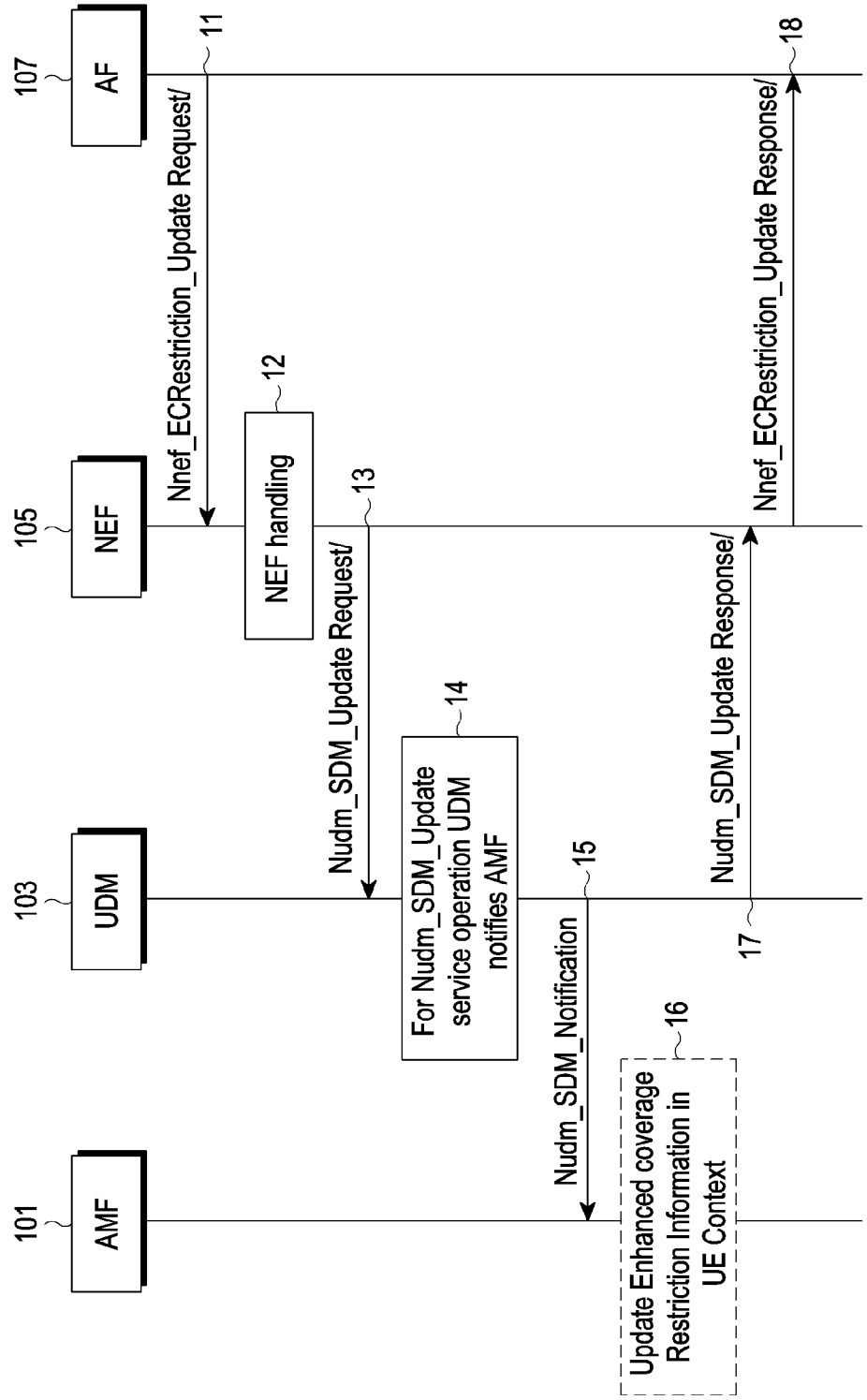
FIG. 1 illustrates a procedure for Enhanced Coverage Restriction Control via NEF.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/ or groups thereof described or disclosed in conjunction with a particular aspect, embodiment, example or claim of the present disclosure are to be understood to be applicable to any other aspect, embodiment, example or claim described herein unless incompatible therewith.

Certain examples of the present disclosure provide methods, apparatus and systems for informing changes in coverage enhancement usage in a network. For example, certain examples of the present disclosure provide methods, apparatus and systems for informing a UE about changes in coverage enhancement usage in 3GPP 5GS. However, the skilled person will appreciate that the present disclosure is not limited to these examples, and may be applied in any suitable system or standard, for example one or more existing and/or future generation wireless communication systems or standards.

The 3GPP 5G standard includes support for coverage enhancement techniques for improving coverage. For example, the relatively higher frequency bands employed by 5G compared to previous communication standards can result in a decrease in base station coverage. Accordingly, coverage enhancement techniques are used to mitigate such reduction of coverage. Possible coverage enhancement techniques include utilising higher transmit power and/or greater transmission (e.g., time/frequency) resources, as well as techniques such as Carrier Aggregation (CA) and beamforming. 5G supports two Coverage Enhancement (CE) modes, known as CE mode A (providing moderate coverage enhancement) and CE mode B (providing a high degree of coverage enhancement).

Due to the increased resource usage in coverage enhancement, the usage of coverage enhancement can be restricted on a per-UE basis. For example, 3GPP TS 23.501 V16.3.0 (2019-12), Clause 5.31.12 states:

"The usage of Enhanced Coverage requires use of extensive resources (e.g., radio and signalling resources). Specific subscribers can be restricted to use Enhanced Coverage feature through Enhanced Coverage Restricted information that is stored in the UDM as part of subscription data and specifies per PLMN whether the Enhanced Coverage functionality is restricted or not for the UE. Enhanced Coverage Restricted information indicates whether CE mode B is restricted for the UE, or both CE mode A and CE mode B are restricted for the UE, or both CE mode A and CE mode B are not restricted for the UE.

The support for Enhanced Coverage Restriction Control via NEF enables AF to query status of Enhanced Coverage Restriction or enable/disable Enhanced Coverage Restriction per individual UEs. The procedure for Enhanced Coverage Restriction Control via NEF is described in clause 4.27 of [3GPP] TS 23.502 [V16.3.0 (2019-12)]."

In other words, an external Application Function (AF) can interact with the 3GPP system via the Network Exposure Function (NEF) to either query the status of enhanced coverage for the UE, or to disable/enable the use of enhanced coverage for the UE. The determination by the network to allow the use of coverage enhancement for a UE is not permanent and is subject to change based on operator policy, subscription information, or requests from third party AFs that interact with the 3GPP system via the NEF.

The use of coverage enhancement for Cellular Internet of Things (CIoT) is indicated to the UE during the registration procedure. In particular, the UE indicates support for restriction on use of enhanced coverage in the Registration Request message, and the AMF indicates whether the use of enhanced coverage is allowed in the Registration Accept message.

For example, 3GPP TS 24.501 V16.3.0 (2019-12), Clauses 5.3.18, 5.5.1.2.2, 5.5.1.3.2, 5.5.1.2.4 and 5.5.1.3.4 state:

[Clause 5.3.18]

"The UE supporting restriction on use of enhanced coverage indicates its support for restriction on use of enhanced coverage in the REGISTRATION REQUEST message. If the UE supports restriction on use of enhanced coverage, the AMF indicates whether the use of enhanced coverage is restricted or not in the REGISTRATION ACCEPT message (see subclause 5.5.1.2 and subclause 5.5.1.3). If the use of enhanced coverage is restricted, the UE shall not use enhanced coverage in the registered PLMN and in any PLMN which is in the list of equivalent PLMNs."

[Clauses 5.5.1.2.2 and 5.5.1.3.2]

"If the UE supports the restriction on use of enhanced coverage, the UE shall set the RestrictEC bit to "Restriction on use of enhanced coverage supported" in the 5GMM capability IE of the REGISTRATION REQUEST message."

[Clause 5.5.1.2.4 and 5.5.1.3.4]

"If the UE indicates support for restriction on use of enhanced coverage in the REGISTRATION REQUEST message and the AMF decides to restrict the use of enhanced coverage for the UE, then the AMF shall set the RestrictEC bit to "Use of enhanced coverage is restricted" in the 5GS network feature support IE in the REGISTRATION ACCEPT message."

Restrictions on use of coverage enhancement impacts, at least, the Network Access Stratum (NAS) timers for 5G Mobility Management (5GMM) and 5G Session Management (5GSM) at both the UE and the network. For example, a UE in Narrowband (NB)-IoT that is using enhanced coverage will add 240 s to the normal 5GMM NAS procedure timers.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

FIG. 1 illustrates a procedure for Enhanced Coverage Restriction Control via NEF as disclosed in 3GPP TS 23.502 V16.3.0 (2019-12), Clause 4.27.1. In step 11 of FIG. 1, the AF 107 may enable or disable enhanced coverage restriction by sending the Nnef_ECRestriction_Update Request. In step 12 of FIG. 1, if the AF 107 is not authorized to perform the request or if the AF 107 has exceeded its quota or rate of submitting enhanced coverage requests, the NEF 105 performs step 18 and provides a cause value appropriately indicating the failure result. In step 13 of FIG. 1, The NEF 13 sends the Nudm_SDM_Update Request to update the subscription data for enhanced coverage restriction. In step 14 of FIG. 1, the UDM 103 examines whether enhanced coverage restriction is supported by the serving NF (i.e., AMF 101 in this case). If this check fails, the UDM provides a cause value indicating the reason for failure condition to the NEF in step 17.

As illustrated in FIG. 1, when the AMF 101, via interaction with the UDM 103, updates the use of coverage enhancement for a UE, the NAS entities in the network (5GMM entity in the AMF 101 and 5GSM entity in the SMF) and in the UE (5GMM and 5GSM entities) need to be informed so that the corresponding NAS timers are used accordingly. For example, if the coverage enhancement is now permitted (i.e., not restricted), then the NAS should apply extended NAS timers for the corresponding procedures as described in 3GPP TS 24.501 V16.3.0 (2019-12).

3GPP TS 23.502 V16.3.0 (2019-12), Clause 4.3.3.2 states:

"1f. (AMF initiated modification) If the UE supports CE mode B and use of CE mode changes from restricted to unrestricted or vice versa in the Enhanced Coverage Restriction information in the UE context in the AMF and the UE has already established PDU sessions, then the AMF shall trigger a PDU session modification to the SMFs serving the UE's PDU sessions and include the extended NAS-SM indication only if use of CE mode B is now unrestricted in the Enhanced Coverage Restriction information in the UE context in the AMF."

Accordingly, the AMF 101 triggers a PDU session modification to the SMF 113 to inform about the change in restriction regarding coverage enhancement.

When a change in coverage enhancement restriction for a UE occurs, the relevant network entities should be informed of the change so that the appropriate timer values are applied in the corresponding NAS entities accordingly. Moreover, the NAS entities in the UE and the network should be synchronized with respect to the NAS timers used. That is, all entities should either use the normal timers, or all entities should use the extended timers. It should not be the case that the network uses extended timers but not the UE, or vice versa.

Therefore, what is desired is a technique for informing changes (e.g., informing a UE about changes) in coverage enhancement usage (e.g., in 3GPP 5GS). For example, what is desired is a technique that reduces or minimises the delay in informing changes in coverage enhancement usage.

The above information is presented as background information only to assist with an understanding of the present disclosure. No determination has been made, and no assertion is made, as to whether any of the above might be applicable as prior art with regard to the present disclosure.

The following examples are applicable to, and use terminology associated with, 3GPP 5GS. However, the skilled person will appreciate that the techniques disclosed herein are not limited to 3GPP 5GS. For example, the functionality of the various network entities disclosed herein may be applied to corresponding or equivalent entities in other communication systems or standards. Corresponding or equivalent entities may be regarded as entities that perform the same or similar role within the network. For example, the functionality of the Access and Mobility Management Function (AMF) in the examples below may be applied to any other suitable type of entity performing mobility management functions. The skilled person will also appreciate that the transmission of information between network entities is not limited to the specific form or type of messages described in relation to the examples disclosed herein.

In the following examples, a network may include a User Equipment (UE) 109, a Radio Access Network (RAN) 111, an Access and Mobility Management Function (AMF) entity 101, and one or more Session Management Function (SMF) entities 113.

The RAN 111 includes base stations (eNB/gNB). In 5G, the processing of the RAN 111 is split into a Control Plane and a User Plane. The AMF 101 receives all connection and session related information from the UE 109 (N1/N2) but is responsible only for handling connection and mobility management tasks. All messages related to session management are forwarded over the N11 reference interface to the SMF 113. The AMF 101 performs the role of access point to the 5G Core Network (5GC). The functional description of AMF 101 is given in 3GPP TS 23.501 clause 6.2.1.

A particular network entity may be implemented as a network element on a dedicated hardware, as a software instance running on a dedicated hardware, and/or as a virtualised function instantiated on an appropriate platform, e.g., on a cloud infrastructure.

The skilled person will appreciate that the present disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements or entities may be added to the examples disclosed herein.

One or more non-essential elements or entities may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

As mentioned above, when a change in coverage enhancement restriction for a UE occurs, the relevant network entities should be informed of the change so that the appropriate timer values are applied in the corresponding NAS entities accordingly. Moreover, the NAS entities in the UE and the network should be synchronized with respect to the NAS timers used. That is, all entities should either use the normal timers, or all entities should use the extended timers. It should not be the case that the network uses extended timers but not the UE, or vice versa. In Step 16 of FIG. 1, the AMF 101 updates the Enhanced Coverage Restriction information stored in the UE context. Subsequently, the UDM 103 sends a response (Nudm_SDM_Update Response or Nudm_SDM_Get Response) to the NEF 105 in Step 17, and the NEF 105 sends a response (Nnef_ECRestriction_Update Response or Nnef_ECRestriction_Get Response) to the AF 107 in Step 18. Accordingly, when the AMF 101 updates the Enhanced Coverage Restriction information, the SMF 113 is informed when the restriction regarding the use of coverage enhancement changes. However, 3GPP TS 23.502 V16.3.0 (2019-12), Clause 4.27.1 states:

NOTE: UE is informed of the updated Enhanced Coverage Restriction information at the next Registration procedure or based on the local policy the network can de-register the UE indicating re-registration is required.

That is, in FIG. 1, the UE 109 is not informed that the restriction regarding the use of coverage enhancement has changed. Rather, informing the UE 109 is delayed until the next registration procedure. This can result in an undesirable situation in which, at least for a certain period, the SMF entity 113 in the network uses different NAS timer ranges from the 5GSM entity in the UE 109.

In certain situations, there may be a relatively long time before the UE 109 initiates a registration procedure, and therefore there may be a relatively long delay before the network is able to inform the UE 109 about the updated status regarding restriction of coverage enhancement.

For example, the UE 109 may be in connected mode, sending user data, and no trigger becomes available for the initiation of a registration procedure.

Figure 2:
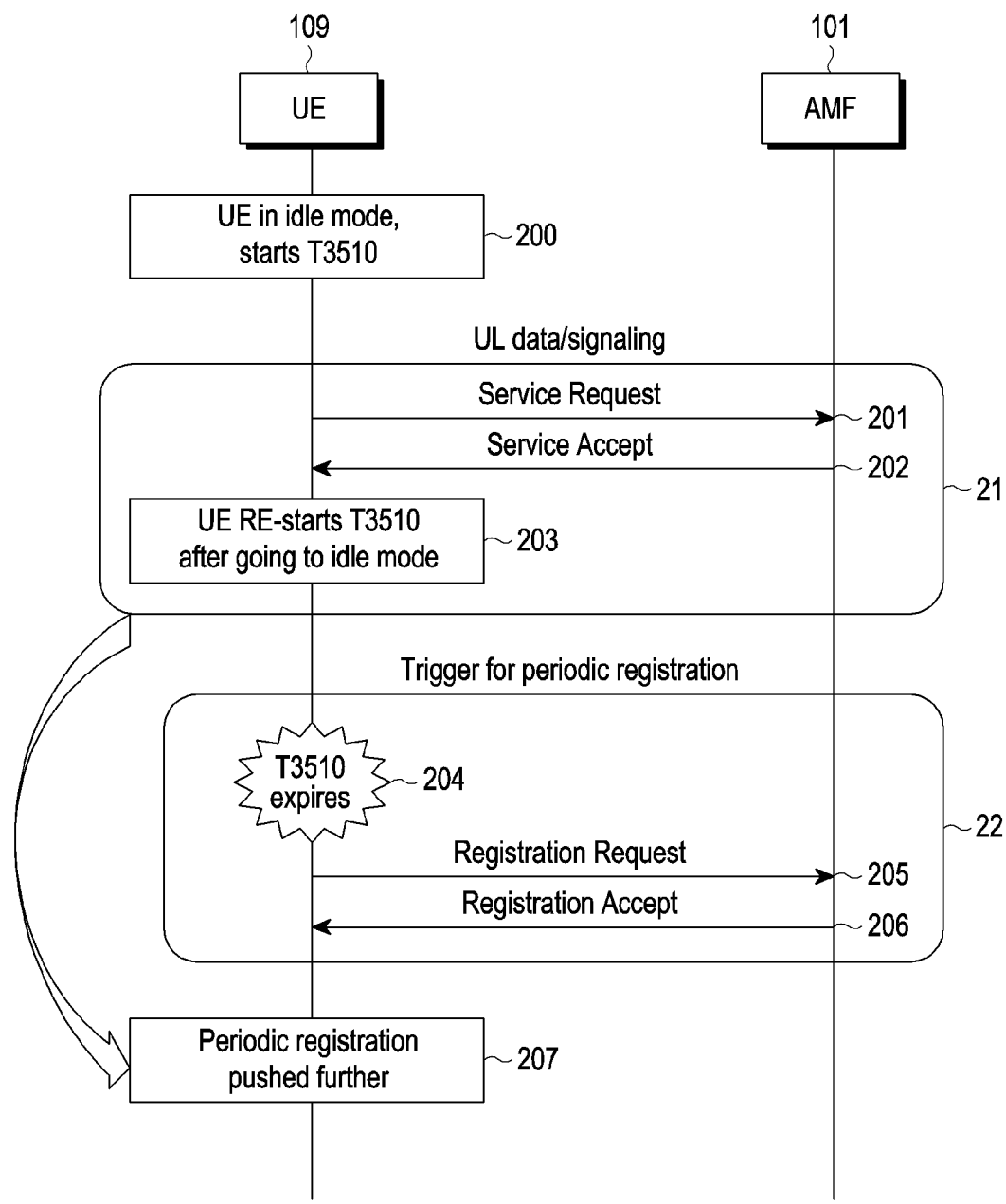
FIG. 2 illustrates an exemplary scenario in which informing changes in coverage enhancement usage may be delayed.

Another example why there may be a long delay before the UE 109 performs a registration procedure is illustrated in FIG. 2. As illustrated in FIG. 2, a UE 109 starts to operate in idle mode in Step 200. When the UE 109 enters idle mode, the UE 109 starts a periodic registration timer (T3510). At the expiry of the periodic timer, the UE 109 should enter connected mode and perform a periodic registration procedure (22), as shown in Steps 204, 205, 206.

However, as illustrated in Step 201, 202, 203, if the UE 109 has Uplink (UL) data or signalling (21) to send before the expiry of the periodic registration timer, the UE 109 initiates a service request procedure, and once in connected mode, the timer T3510 is reset. Upon transitioning to idle mode, the UE 109 re-starts T3510 in Step 203. In this case, expiry of the periodic registration timer, and hence initiation of the periodic registration procedure 207, is delayed by a period illustrated by the curved arrow in FIG. 2.

The same or other triggers can occur, possibly repeatedly, before the next periodic registration, and hence a periodic registration procedure from the UE 109 can be delayed significantly. This in turn will result in a delay in the AMF 101 updating the UE 109 with the latest restriction on coverage enhancement usage. If no other trigger for registration procedure occurs, then the update from the network can be delayed for a very long time.

Delays in updating the UE 109 with the latest restriction on coverage enhancement usage impacts the service that is expected and requested by an AF 107. In particular, a situation can arise in which the AF 107 has requested a particular configuration for enhanced coverage usage, but the network is not able to enforce the requested configuration due to a delayed registration procedure from the UE 109.

In addition, the AMF 101 should preferably not inform the SMF 113 about the changes in restriction for enhanced coverage if the UE 109 is not yet informed since all entities, including the UE 109, should be in synchronisation with respect to the appropriate NAS timer ranges to be used. Preferably, the UE 109 should be informed about the latest update first, before other entities are informed.

Certain examples of the present disclosure provide a technique for informing a UE about changes in coverage enhancement usage. In particular, certain examples of the present disclosure provide a technique that reduces or minimises the delay in informing changes in coverage enhancement usage.

To address the problems discussed above, in certain examples of the present disclosure, the network takes a proactive measure to inform the UE about an update to the restriction on enhanced coverage.

Certain examples of the present disclosure provide a method, for a first network entity (e.g., AMF entity), for informing a change in coverage enhancement usage in a network comprising the first network entity and a UE. The method comprises: in response to determining that a restriction on the use of coverage enhancement has changed for the UE, transmitting, to the UE, a first message (e.g., a CUC message) including an indication (e.g., in an UpdateCE field) of the change.

In certain examples, the method may further comprise: if the UE is in an idle mode, initiating a procedure for transitioning the UE to a connected mode before transmitting the first message (e.g., by transmitting a paging message to the UE, via a Radio Access Network (RAN) entity in the network, and/or by transmitting a Notification message via the non-3GPP access/non-3GPP InterWorking Function).

In certain examples, the method may further comprise: receiving, from the UE, a registration request message; and in response to the registration request message, transmitting, to the UE, a registration accept message. The registration request message may comprise an indication of support, by the UE, for restriction on use of enhanced coverage. The registration accept message may comprises an indication of a current restriction on the use of coverage enhancement for the UE.

In certain examples, the method may further comprise performing a configuration (e.g., applying a timer value, for example a NAS timer value) based on the current restriction on the use of coverage enhancement for the UE.

In certain examples, the method may further comprise transmitting, to a second network entity (e.g., an SMF entity) in the network that has an established PDU session with the UE, a second message (e.g., a message for initiating a PDU session modification procedure) comprising an indication of the current restriction on the use of coverage enhancement for the UE.

In certain examples, the method may further comprise receiving, from the UE, a Configuration Update Complete message in response to the CUC message.

Certain examples of the present disclosure provide a method, for a UE, for informing a change in coverage enhancement usage in a network comprising a first network entity (e.g., AMF entity) and the UE. The method comprises: receiving, from the first network entity, a first message (e.g., a CUC message) including an indication (e.g., in an UpdateCE field) of a change in a restriction on the use of coverage enhancement for the UE.

In certain examples, the method may further comprise: in response to the first message, initiating a registration procedure based on the indication.

In certain examples, initiating the registration procedure may comprise: transmitting, to the first network entity, a registration request message; and receiving, from the first network entity, in response to the registration request message, a registration accept message. The registration request message may comprises an indication of support, by the UE, for restriction on use of enhanced coverage. The registration accept message may comprises an indication of a current restriction on the use of coverage enhancement for the UE.

In certain examples, the method may further comprise: in response to the first message, changing a current use of coverage enhancement usage based on the type of use of coverage enhancement applied at the time the first message is received.

In certain examples, changing the current use of coverage enhancement usage may comprise: if a first type of use of coverage enhancement (e.g. use of enhanced coverage is not restricted) is applied at the time the first message is received, changing to a second type of use of coverage enhancement (e.g. use of enhanced coverage is restricted); and/or if the second type of use of coverage enhancement (e.g. use of enhanced coverage is restricted) is applied at the time the first message is received, changing to the first type of use of coverage enhancement (e.g. use of enhanced coverage is not restricted).

In certain examples, the method may further comprise performing a configuration (e.g., applying a timer value, for example a NAS timer value) based on the current restriction on the use of coverage enhancement for the UE.

Certain examples of the present disclosure provide a first network entity (e.g., AMF entity) configured to operate a suitable method according to any of the examples disclosed herein.

Certain examples of the present disclosure provide a UE configured to operate a suitable method according to any of the examples disclosed herein.

Certain examples of the present disclosure provide a network comprising a first network entity (e.g., AMF entity) and a UE according to any of the examples disclosed herein.

Certain examples of the present disclosure provide a computer program comprising instructions which, when the program is executed by a computer, cause the computer to carry out a suitable method according to any of the examples disclosed herein. Certain examples of the present disclosure provide a computer-readable data carrier having stored thereon such a computer program.

Figure 3:
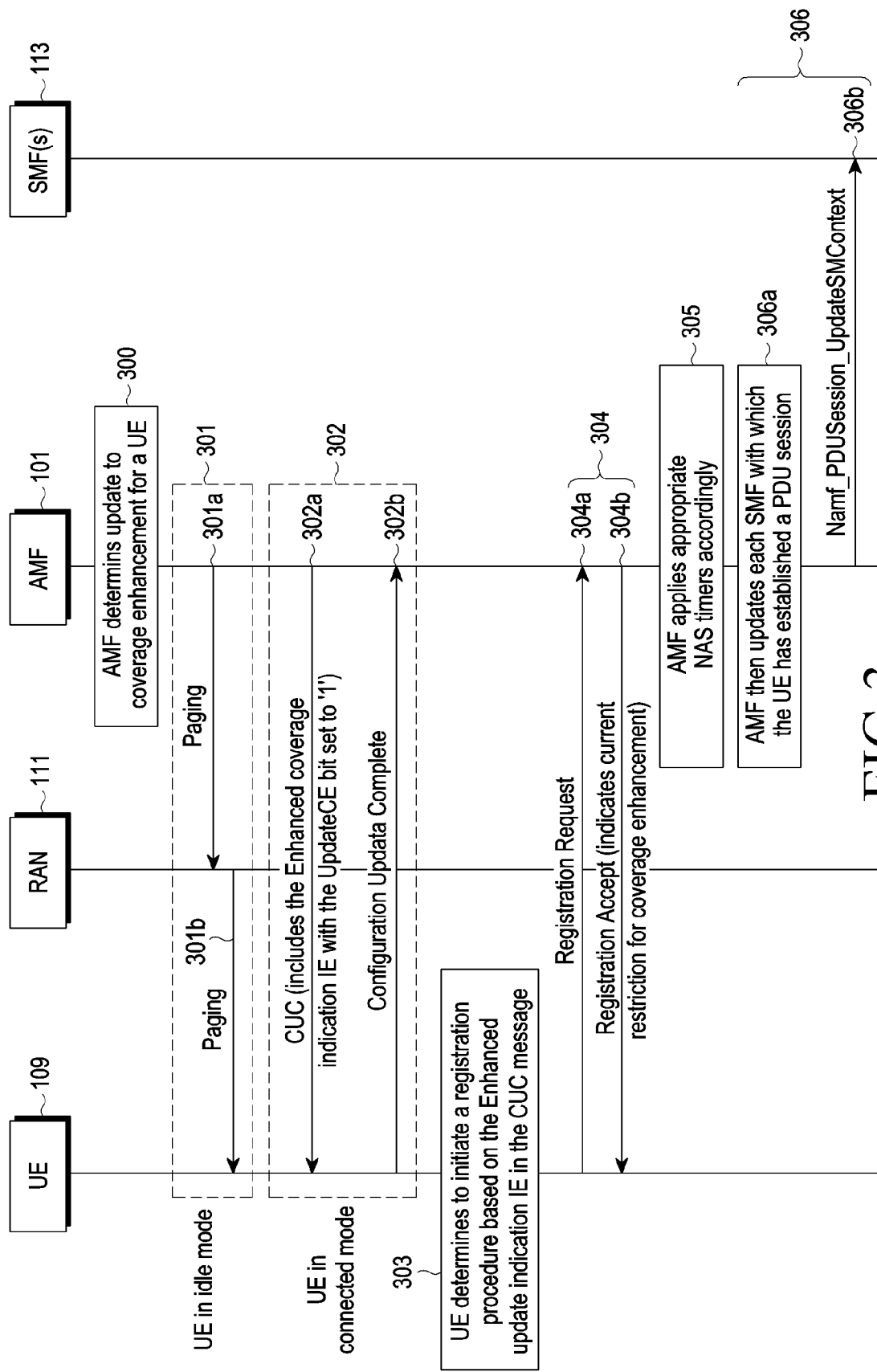
FIG. 3; illustrates an exemplary signal flow according to certain examples of the present disclosure.

One exemplary technique is illustrated in FIG. 3, although the skilled person will appreciate that the present disclosure is not limited to the specific example illustrated in FIG. 3. As illustrated, a network includes a UE 109, RAN 111, AMF 101 and SMF 113.

In Step 300, the AMF 101 determines that a restriction on the use of coverage enhancement has changed. For example, this determination may be based on local policies or due to a change in subscription information, optionally as requested by an AF 107 via the NEF 105.

Figure 4:
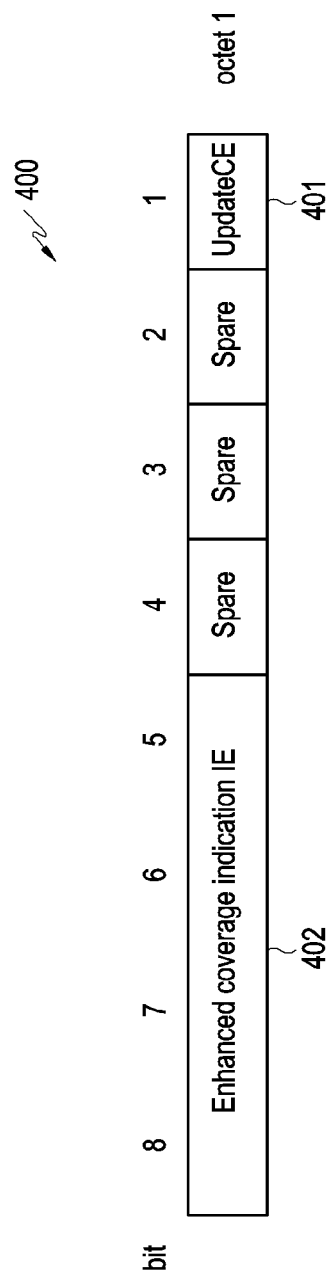
FIG. 4 illustrates an exemplary message structure for informing changes in coverage enhancement usage.

When the AMF 101 determines that the restriction on coverage enhancement for a UE 109 has changed, the AMF 101 should send a suitable indication to the UE 109 and the change should be synchronised between the various entities. Accordingly, the following Steps 301 to 306 may be carried out for this purpose. As described further below, in certain examples of the present disclosure, the new indication may be communicated using a Configuration Update Command (CUC) message that is sent to the UE 109. An Enhanced coverage indication IE and UpdateCE may be defined and included in the CUC message, as illustrated in FIG. 4.

In Step 301 (including sub-steps 301a and 301b), if the UE 109 is in idle mode, a procedure (e.g., paging procedure) is carried out to cause the UE 109 to transition to connected mode. In the present example, the AMF 101 determines whether to immediately inform the UE in the idle mode about the change in restriction on the use of coverage enhancement. For example, this determination may be based on local policy or based on the priority of the requesting AF 107 that the AMF 101 may be configured with. If the AMF 101 determines to immediately inform the UE 109 then the AMF 101 initiates a paging procedure via the RAN 111 in sub-steps 301a and 301b, thereby causing the UE 109 to transition to the connected mode.

FIG. 3 does not show a response to the paging from the UE. However, the skilled person will appreciate that the UE 109 may transmit a paging response to the AMF 101 via the RAN 111 in certain examples. The skilled person will also appreciate that Step 1 may be omitted if the UE 109 is not in the idle mode.

In Step 302 (including sub-steps 302a and 302b), when the UE 109 is in the connected mode, for example in response to the paging procedure described in Step 301, a procedure is carried out to inform the UE 109 of the change in the restriction on the use of coverage enhancement. In the present example, in Step 302a the AMF 101 sends a message to the UE 109 comprising an indication of the change in the restriction on the use of coverage enhancement, and in Step 302b the UE 109 responds with a response message to the AMF 101.

The message sent in Step 302a may comprise a Configuration Update Command (CUC) message, and the response message sent in Step 302b may comprise a Configuration Update Complete message. One example of the structure of the CUC message is illustrated in FIG. 4. As shown, the CUC message 400 includes an Enhanced coverage indication IE 402 (e.g., 4 bits, bits 5-8), an UpdateCE field 401 (e.g., 1 bit, bit 1), and unused space (e.g., 3 bits, bits 2-4). For example, the unused space may be reserved for some purpose in the future. The CUC message may also comprise a Configuration update indication IE (not shown in FIG. 4) including, for example, an Acknowledgment request field (e.g., 1 bit) and a Registration request field (e.g., 1 bit). The skilled person will appreciate that the structure of the message sent in Step 302a is not limited to that illustrated in FIG. 4 or described above.

The AMF 101 may send the message to inform the UE 109 that the restriction on enhanced coverage has changed. The AMF 101 may set the UpdateCE field 401 of the CUC message 400 sent in Step 302a to a first predetermined value (e.g., '1') to signal 'restriction on coverage enhancement has been updated'. On the other hand, a second predetermined value (e.g., '0') may be set to signal 'restriction on coverage enhancement has not been updated'. The AMF 101 may also set the Acknowledgement request field of the CUC message 400 to a predetermined value (e.g., '1') to indicate "acknowledgement requested", and may set the Registration request field of the CUC message 400 to a predetermined value (e.g., '1') to indicate "registration requested".

Accordingly, when the UE 109 receives a CUC message 400 with the Enhanced coverage indication IE 402 present, and with the UpdateCE bit 401 set to the first predetermined value (e.g., '1') indicating that restriction on coverage enhancement has been updated, the UE 109 may first acknowledge the receipt of this indication by sending a Configuration Update Complete message. The acknowledgement may be based on the "acknowledgement requested" that may be received in the CUC message 400.

In Step 303, the UE 109 determines whether to initiate a registration procedure based on the indication in the message that was received in Step 302a. For example, if the UpdateCE field 401 of the CUC message 400 received in Step 302a is set to the first predetermined value to signal 'restriction on coverage enhancement has been updated' then the UE 109 initiates the registration procedure.

In Step 304 (including sub-steps 304a and 304b), the UE 109 performs the registration procedure. For example, in Step 304a the UE 109 sends a Registration Request message to the AMF 101, and in Step 304b the AMF 101 sends a Registration Accept message to the UE 109. That is, when the AMF 101 receives a Registration Request message from the UE 109 and the AMF 101 has updated information regarding restriction on coverage enhancement, the AMF 101 may inform the UE 109 about whether the use of coverage enhancement is restricted or not using the Registration Accept message.

In the Registration Request message, the 5GS registration type IE may be set to "mobility registration updating". The UE 109 may also indicate its support for restriction on use of enhanced coverage. The registration Accept message may indicate the current restriction on coverage enhancement for the UE 109 (e.g., whether the use of coverage enhancement is restricted or not). After receiving the indication of the current restriction on coverage enhancement for the UE 109, the UE 109 performs any necessary configuration (e.g., applies the appropriate NAS timer values) based on the indicated current restriction on coverage enhancement.

The skilled person will appreciate that, in alternative examples, the indication of the current restriction on coverage enhancement for the UE 109 provided in the Registration Accept message sent in Step 304*b* may be provided in, or together with, the CUC message 400 sent in Step 302*a*.

In certain examples, the CUC transmitted from the AMF to the UE indicates (via the UpdateCE bit) whether or not a change in restriction on use of enhanced coverage has occurred. This allows the UE to determine that a change has occurred ("change" or "no change"), but may not allow the UE what the new restriction is (i.e., what has changed). The registration request transmitted from the UE to the AMF contains an indication of whether or not the UE supports restriction on use of enhanced coverage, while the registration accept transmitted from the AMF to the UE may contain detailed information on what the new restriction is (e.g., what the change signalled by the UpdateCE bit is).

In certain examples, the information provided to the UE in the registration accept message may instead be provided in, or together with, the CUC. In this case, the registration procedure may not be required.

However, in other examples, allowing a service for a UE (e.g., use or not of coverage enhancement) should first be requested by the UE. In this case, the network may not be allowed to send an indication to the UE to start using a service "X" if the UE does not request service "X" first. Furthermore, it may not be possible to guarantee that the UE will always keep using a service, and therefore it may be preferable to only provide the service if the UE actually requests the service. Accordingly, a service, or change in service, may first require a request from the UE, for example in the form of the Registration Request message. In view of the above, the Registration Request from the UE may indicate if the UE actually wants to use the service or not, even if something has changed in the network.

In Step 305, the AMF 101 performs any necessary configuration (e.g., applies the appropriate NAS timer values) based on the current status of the restriction on use of coverage enhancement for the UE 109.

Following this, the AMF 101 then updates the SMF(s) 113 regarding the restriction on enhanced coverage. In the present example, this is achieved by triggering a PDU session modification procedure, for example as described in 3GPP TS 23.502 V16.3.0 (2019-12), Clause 4.3.3.2, Step 1f.

Accordingly, in Step 306 (including sub-steps 306*a* and 306*b*), for every SMF 113 with which the UE 109 has an established PDU session, the AMF 101 initiates a PDU session modification procedure to indicate the current status on restriction of use of coverage enhancement for the UE 109. For example, in Step 306*a* the AMF 101 updates each SMF 113 with which the UE 109 has established a PDU session, and in Step 306*b* the AMF 101 sends a Namf_P-DUSession_UpdateSMContext message to each such SMF 113.

According to the above method, the AMF 101 performs the following operations: (i) optionally page the UE 109, if the UE 109 is in idle mode, (ii) when the UE 109 is in connected mode, send a CUC message 400 to the UE 109 with a new indication about the update of the restriction on enhanced coverage, which in turn triggers the UE 109 to immediately perform a registration procedure, (iii) update the UE 109 with the current restriction (e.g. restricted or not) regarding the use of enhanced coverage in a Registration Accept message, and (iv) after this is done, inform the SMF(s) 113 about the update regarding coverage enhancement restriction.

In addition, the AMF 101 may also inform the RAN 111 about the update. However, this can be done as part of the NG-AP procedure that is used to transfer the Registration Accept message from the AMF 101 to the RAN 111 (eNB/gNB).

Figure 5:
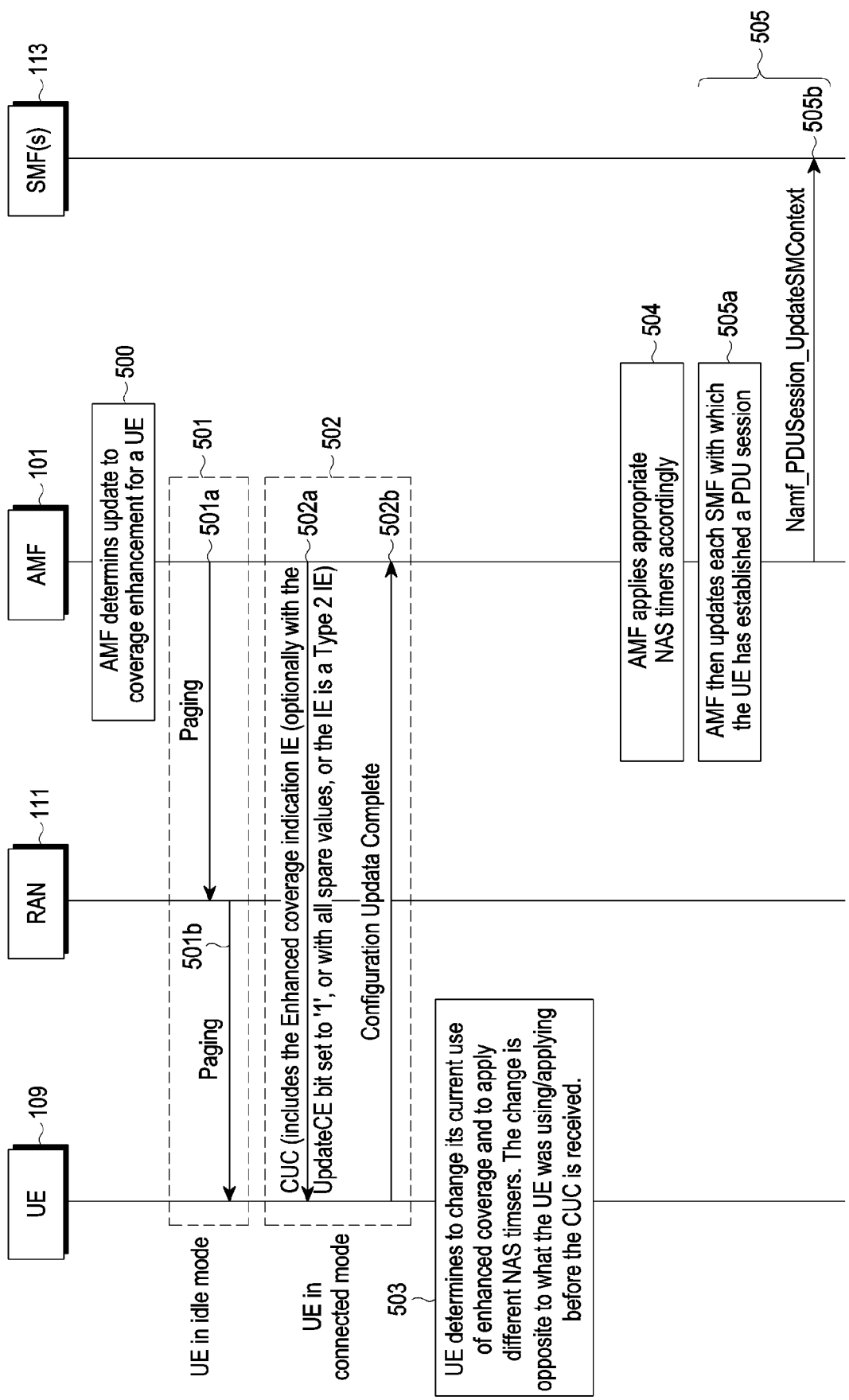
FIG. 5 illustrates another exemplary signal flow according to certain examples of the present disclosure.

Another exemplary technique is illustrated in FIG. 5. For example, the technique of FIG. 5 may be used as an alternative to the technique of FIG. 3 in certain examples of the present disclosure.

The technique of FIG. 5 may provide a solution in which the UE 109 autonomously applies different NAS timers based on an indication from the network.

When the AMF 101 determines, in Step 500, that the use of coverage enhancement has changed (e.g., from unrestricted to restricted, or from restricted to unrestricted), the AMF 101 may first page, in Step 501 (including sub-steps 501*a* and 501*b*), a UE 109 that is in 5GMM-IDLE mode (or in 5GMM-IDLE mode with suspend indication) to transition the UE 109 to connected mode. For a UE 109 in connected mode and for which the use of coverage enhancement has changed, the AMF 101 sends, in Step 502*a*, a CUC message. In certain examples, the CUC message may comprise an information element, for example as described above (e.g., an Enhanced coverage indication IE). The skilled person would appreciate that the IE may be referred to by any suitable name and is not limited to the name used herein.

In certain examples, the IE may be a Type 2 information element (i.e., the IE may be an IE with a type field only but no value).

In certain examples, when sending the CUC message to the UE 109, the AMF 101 may optionally request an acknowledgement from the UE 109, for example by setting the ACK bit to "acknowledgement requested" in the Configuration update indication IE, for example as defined in TS 24.501.

Upon reception of the CUC message with an IE (e.g., an Enhanced coverage indication IE), the UE 109 may take the following actions:

a) the UE 109 may acknowledge the receipt of the IE, for example by sending, in Step 502 (including sub-steps 502*a* and 502*b*), a Configuration Update Complete message. In certain examples, this message may be sent optionally due to the reception of the Configuration update indication IE with the ACK bit set to "acknowledgement requested", and optionally due to the IE being included in the CUC message.

b) after sending the Configuration Update Complete message, the UE 109 may take the following actions, in Step 503, optionally based on receipt of the IE (e.g., Enhanced coverage indication IE):

1) if the last Registration Accept message contained the 5GS network feature support IE with the RestrictEC bit indicating that "Use of enhanced coverage is not restricted" (for example as defined in TS 24.501) or if the UE 109 was operating such that enhanced coverage was not restricted (and hence was using extended NAS timers), the UE 109 may now consider that the use of enhanced coverage is restricted (e.g. the UE 109 should behave as if a Registration Accept message has been received containing the 5GS network feature support IE with the RestrictEC bit indicating that "Use of enhanced coverage is restricted"). Furthermore, if the UE 109 was applying extended 5GMM NAS timers and extended 5GSM NAS timers, the UE 109 may autonomously switch to, or apply, normal (i.e., non-extended) 5GMM NAS timers and normal (i.e., non-extended) 5GSM NAS timers. From this point onward, all NAS procedures at the 5GMM or 5GSM layer may use the normal NAS timer values. Additionally, the 5GMM layer or entity in the UE 109 may inform the 5GSM layer or entity in the UE 109 to apply normal NAS timers. Optionally, if the UE 109 has an ongoing NAS procedure for which an extended NAS timer was applied, the UE 109 may modify the timer such that a non-extended value would apply. Alternatively, the timers for ongoing procedures may not be modified until the procedure ends or the timer expires.

2) if the last Registration Accept message contained the 5GS network feature support IE with the RestrictEC bit indicating that "Use of enhanced coverage is restricted" (for example as defined in TS 24.501) or if the UE 109 was operating such that enhanced coverage was restricted (and hence was using normal, i.e. non-extended, NAS timers), the UE 109 may now consider that the use of enhanced coverage is not restricted (e.g. the UE 109 should behave as if a Registration Accept message has been received containing the 5GS network feature support IE with the RestrictEC bit indicating that "Use of enhanced coverage is not restricted"). Furthermore, if the UE 109 was applying normal (i.e., non-extended) 5GMM NAS timers and normal (i.e., non-extended) 5GSM NAS timers, the UE 109 may autonomously switch to, or apply, extended 5GMM NAS timers and extended 5GSM NAS timers. From this point onward, all NAS procedures at the 5GMM or 5GSM layer may use the extended NAS timer values. Additionally, the 5GMM layer or entity in the UE 109 may inform the 5GSM layer or entity in the UE 109 to apply extended NAS timers. Optionally, if the UE 109 has an ongoing NAS procedure for which an extended NAS timer was applied, the UE 109 may modify the timer such that an extended value would apply. Alternatively, the timers for ongoing procedures may not be modified until the procedure ends or the timer expires.

Upon reception of a Configuration Update Complete message (e.g., optionally from a UE 109), in response to a CUC message that included an IE (e.g., an Enhanced coverage indication IE), the AMF 101 may apply, in 504, appropriate NAS timers, and update, in Step 505 (including sub-steps 505*a* and 505*b*), the SMF(s) 113 to use the appropriate NAS timer accordingly, for example in a similar manner as described above in relation to FIG. 3. Similarly, the AMF 101 may update the RAN (or NG-RAN) about the current status of the use of enhanced coverage so that the appropriate RRC timers are used. In FIG. 5, the indication to update the RAN is not shown for simplicity.

The skilled person will appreciate that, in certain examples, the techniques described above may be applied to the use of CE mode A or CE mode B. For example, the same techniques described above may be applied for a UE 109 that supports CE mode A or CE mode B, and for which:

a) the subscription changes regarding the use of CE mode A or CE mode B, b) the AMF 101 determines a change (e.g., based on local policies) regarding the use of CE mode A or CE mode B.

The skilled person would appreciate that, in the techniques described above, one or more steps/operations may occur in a different order or combination in certain examples. The skilled person would also appreciate that the techniques described above may be used in a similar manner when a change regarding the use of CE mode A or CE mode B happens as described above.

As described above, in certain conventional techniques, a UE may not perform a registration procedure, or such procedure may be significantly delayed, thereby risking a situation where the UE and the network entities are not using the same NAS timer values, at least temporarily. According to certain examples of the present disclosure, a UE may be informed of a change in restriction on the use of coverage enhancement in a faster manner compared to conventional techniques. Moreover, in certain examples of the present disclosure, the sequence of indications from the AMF towards the UE and SMF ensures that all entities are properly synchronized with respect to which NAS timer values to use. Accordingly, certain examples of the present disclosure may ensure that AFs can have a predictable behaviour for the UEs in question, and hence the service experience is as expected.

Certain examples of the present disclosure may be provided in the form of an apparatus/device/network entity configured to perform one or more defined network functions and/or a method therefor. Certain examples of the present disclosure may be provided in the form of a system comprising one or more such apparatuses/devices/network entities, and/or a method therefor.

Figure 6:
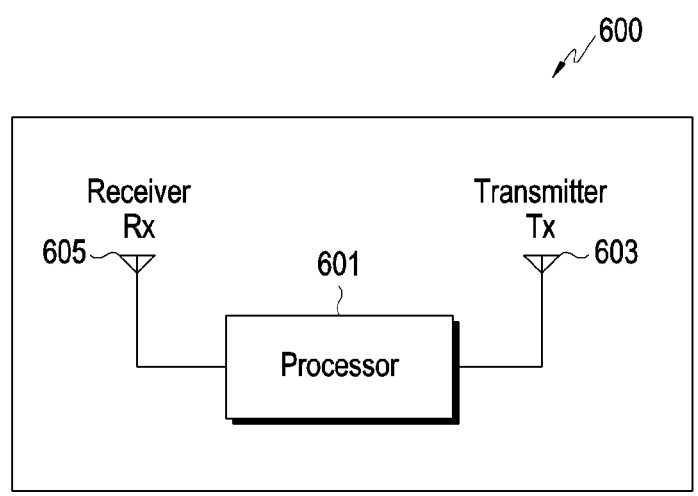
FIG. 6 is a block diagram of an exemplary network entity that may be used in certain examples of the present disclosure.

FIG. 6 is a block diagram of an exemplary network entity that may be used in examples of the present disclosure. For example, the AMF may be provided in the form of the network entity illustrated in FIG. 6. The skilled person will appreciate that the network entity illustrated in FIG. 6 may be implemented, for example, as a network element on a dedicated hardware, as a software instance running on a dedicated hardware, and/or as a virtualised function instantiated on an appropriate platform, e.g., on a cloud infrastructure.

The entity 600 comprises a processor (or controller) 601, a transmitter 603 and a receiver 605. The receiver 605 is configured for receiving one or more messages from one or more other network entities, for example one or more of the messages illustrated in FIGS. 3 and/or 5. The transmitter 603 is configured for transmitting one or more messages to one or more other network entities, for example one or more of the messages illustrated in FIGS. 3 and/or 5. The processor 601 is configured for performing operations as described above in relation to FIGS. 3 and/or 5. For example, the processor 601 is configured for performing the operations of an AMF.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims. Although the present disclosure has been described with various embodiments, various changes and modifications may be suggested to one skilled in the art. It is intended that the present disclosure encompass such changes and modifications as fall within the scope of the appended claims.

Abbreviations

In the present disclosure, the following acronyms are used.
3GPP 3rd Generation Partnership Project
5G 5th Generation
5GC 5G Core Network
5GMM 5G Mobility Management
5GS 5G System
5GSM 5G Session Management
AF Application Function
AMF Access and Mobility Management Function
CA Carrier Aggregation
CE Coverage Enhancement
CIoT Cellular IoT
CUC Configuration Update Command
eNB Base Station
gNB 5G Base Station
IE Information Element
IoT Internet of Things
N1 Interface for signalling between UE and AMF
N2 Interface for signalling between UE and AMF via RAN
N11 Interface for signalling between AMF and SMF
NAS Network Access Stratum
NAS-SM NAS Session Management
NB-IoT Narrowband IoT
NEF Network Exposure Function
NF Network Function
PDU Protocol Data Unit
PLMN Public Land Mobile Network
RAN Radio Access Network
SMF Session Management Function
T3510 Periodic Registration Timer
TS Technical Specification
UDM Unified Data Management
UE User Equipment

What is claimed is:

1. A method performed by an access and mobility management function (AMF) in a wireless communication system supporting an enhanced coverage, the method comprising:

identifying whether or not a restriction on a use of the enhanced coverage is changed for a user equipment (UE);
transmitting, to the UE via a radio access network (RAN), a configuration update command message including information for informing a change of the restriction when the restriction on the use of the enhanced coverage is changed for the UE;
determining to apply a non-access stratum (NAS) timer based on the change of the restriction on the use of the enhanced coverage; and
in response to the NAS timer to be applied in a session management function (SMF) being updated based on the change of the restriction on the use of the enhanced coverage, triggering a protocol data unit (PDU) session modification procedure to the SMF serving the UE,
wherein the NAS timer in the SMF serving the UE is synchronized with a NAS timer used in the UE.

2. The method of claim 1, wherein the change of the restriction on the use of the enhanced coverage is identified based on a change in subscription information of the UE.

3. The method of claim 1, wherein the configuration update command message further includes information requesting the UE to perform a registration procedure with the AMF.

4. The method of claim 1, further comprising:
receiving, from the UE via the RAN, a registration request message in response to transmission of the configuration update command message; and
transmitting, to the UE via the RAN, a registration accept message associated with the change of the restriction on the use of the enhanced coverage.

5. An access and mobility management function (AMF) in a wireless communication system supporting an enhanced coverage, the AMF comprising:
a transceiver; and
a processor configured to:
identify whether or not a restriction on a use of the enhanced coverage is changed for a user equipment (UE);
transmit, to the UE via a radio access network (RAN), a configuration update command message including information for informing a change of the restriction when the restriction on the use of the enhanced coverage is changed for the UE;
determine to apply a non-access stratum (NAS) timer based on the change of the restriction on the use of the enhanced coverage; and
in response to the NAS timer to be applied in a session management function (SMF) being updated based on the change of the restriction on the use of the enhanced coverage, trigger a protocol data unit (PDU) session modification procedure to the SMF serving the UE,
wherein the NAS timer in the SMF serving the UE is synchronized with a NAS timer used in the UE.

6. The AMF of claim 5, wherein the change of the restriction on the use of the enhanced coverage is identified based on a change in subscription information of the UE.

7. The AMF of claim 5, wherein the configuration update command message further includes information requesting the UE to perform a registration procedure with the AMF.

8. The AMF of claim 5, wherein the processor is further configured to:
receive, from the UE via the RAN, a registration request message in response to transmission of the configuration update command message; and transmit, to the UE via the RAN, a registration accept message associated with the change of the restriction on the use of the enhanced coverage.

9. A method performed by a user equipment (UE) in a wireless communication system supporting an enhanced coverage, the method comprising:
  receiving, from an access and mobility function (AMF) via a radio access network (RAN), a configuration update command including information for informing a change of a restriction on a use of the enhanced coverage;
  transmitting, to the AMF via the RAN, a registration request message in response to reception of the configuration update command message;
  receiving, from the AMF via the RAN, a registration accept message associated with the change of the restriction on the use of the enhanced coverage; and
  using a non-access stratum (NAS) timer to be applied in a session management function (SMF) serving the UE, based on the change of the restriction on the use of the enhanced coverage,
  wherein the NAS timer used in the UE is synchronized with the NAS timer in the SMF to which a protocol data unit (PDU) session modification procedure is triggered by the AMF.

10. The method of claim 9, wherein the change of the restriction on the use of the enhanced coverage is associated with a change in subscription information of the UE.

11. The method of claim 9, wherein the configuration update command message further includes information requesting the UE to perform a registration procedure with the AMF.

12. A user equipment (UE) in a wireless communication system supporting an enhanced coverage, the UE comprising:
  a receiver; and
  a processor configured to:
    receive, from an access and mobility management function (AMF) via a radio access network (RAN), a configuration update command message including information for informing a change of a restriction on a use of the enhanced coverage;
    transmit, to the AMF via the RAN, a registration request message in response to reception of the configuration update command message;
    receive, from the AMF via the RAN, a registration accept message associated with the change of the restriction on the use of the enhanced coverage; and
    use a non-access stratum (NAS) timer to be applied in a session management function (SMF) serving the UE, based on the change of the restriction on the use of the enhanced coverage,
  wherein the NAS timer used in the UE is synchronized with the NAS timer in the SMF to which a protocol data unit (PDU) session modification procedure is triggered by the AMF.

13. The UE of claim 12, wherein the change of the restriction on the use of the enhanced coverage is associated with a change in subscription information of the UE.

14. The UE of claim 12, wherein the configuration update command message further includes information requesting the UE to perform a registration procedure with the AMF.

* * * * *

UNITED STATES PATENT AND TRADEMARK OFFICE
CERTIFICATE OF CORRECTION

| | |
|---|---|
| PATENT NO. | : 11,570,634 B2 |
| APPLICATION NO. | : 17/248552 |
| DATED | : January 31, 2023 |
| INVENTOR(S) | : Mahmoud Watfa et al. |

It is certified that error appears in the above-identified patent and that said Letters Patent is hereby corrected as shown below:

On the Title Page

(30) Foreign Application Priority Data, delete:
"Jan. 30, 2020 (GB) .......... 2001317
Feb. 24, 2020 (GB) .......... 2002595"
And replace with:
--Jan. 30, 2020 (GB) .......... 2001317.3
Feb. 24, 2020 (GB) .......... 2002595.3--.

Signed and Sealed this
Eleventh Day of April, 2023

Katherine Kelly Vidal
*Director of the United States Patent and Trademark Office*